United States Patent [19]

Hillier et al.

[11] 4,048,255

[45] Sept. 13, 1977

[54] BLEND OF THERMOELASTIC POLYMERS WITH BLOCK RADIAL POLYMERS USED AS PHARMACEUTICAL SEALING AND RESEALING MATERIALS

[75] Inventors: Edward Lawrence Hillier; Glen Henry Graham; Warren Evan Eichelberger, all of Ashland, Ohio

[73] Assignee: Abbott Laboratories, North Chicago, Ill.

[21] Appl. No.: 607,979

[22] Filed: Aug. 26, 1975

[51] Int. Cl.² .................. C08L 27/00; C08L 51/00
[52] U.S. Cl. .................. 260/859 R; 260/336 UA; 260/336 UB; 260/873; 260/876 B; 128/214 R; 260/857 G; 260/857 D
[58] Field of Search .................. 260/876 B, 859 R

[56] References Cited

U.S. PATENT DOCUMENTS

| | | | |
|---|---|---|---|
| 3,562,355 | 2/1971 | Holdon | 260/859 |
| 3,646,161 | 2/1972 | Marwede et al. | 260/876 B |
| 3,686,365 | 8/1972 | Soqueira | 260/876 B |
| 3,753,936 | 8/1973 | Marrs | 260/27 R |

*Primary Examiner*—Richard B. Turer
*Attorney, Agent, or Firm*—Robert L. Niblack; Neil E. Hamilton

[57] ABSTRACT

Radial block copolymers are blended with additional polymeric materials to form rubber-like plastic compositions having high elastic and reseal properties so that they can be utilized as a rubber replacement in the fabrication of resealable injecton sites in intravenous administration equipment and stoppers for containers where resealability after puncture is also a desirable property.

11 Claims, No Drawings

BLEND OF THERMOELASTIC POLYMERS WITH BLOCK RADIAL POLYMERS USED AS PHARMACEUTICAL SEALING AND RESEALING MATERIALS

BACKGROUND OF THE INVENTION

This invention relates to thermoplastic polymers which are useful in molding plastic materials for contact with body fluids. More particularly, it relates to a thermoplastic polymer composed of block radial polymers of the diene-aryl substitued olefin butadiene-styrene type which have blended with them certain polymeric materials to form a plastic composition having a high degree of elasticity and resealability so as to be useful as puncturable reseal units in parenteral administration equipment as well as in containers for materials intended for administration to the body.

Recently, radial block polymers of the butadiene-styrene type have been of particular interest in that they display high tensile strength without vulcanization or filler reinforcement. In U.S. Pat. Nos. 3,281,283 and 3,078,254, a process of making such radial block copolymers is described. Further, particular blends of vulcanized butadiene-styrene block copolymers are indicated in U.S. Pat. No. 3,646,161. In U.S. Pat. No. 3,562,355, a mechanical blend of a butadiene-styrene copolymer is described in combination with a polyester urethane. The prior art nowhere describes a blend of nonvulcanized radial block copolymers of the butadiene-styrene type wherein the butadiene-styrene amounts are of a certain quantity and when combined with certain polymeric materials will form a plastic composition having a sufficient elasticity and resealability so that they are readily adaptable for use in composing plastic closure materials having reseal properties for contact with fluids to be administered to the body. In addition, the prior art nowhere describes a plastic composition which is readily suitable for use in the medical plastics field which will have sufficiently low alkaline extraction nephelos values so that ingredients in the composition are not extracted in with the fluids to be administered after contact with the closure material.

It is an advantage of the present invention to provide a novel blend of radial block copolymers of the butadiene-styrene type with other polymeric materials. Other advantages are a thermoplastic composition of the radial block copolymer type which have a high degree of elasticity and resealability so that they can be employed as a pharmaceutical sealing component such as resealable injection sites in parenteral administration equipment without coring, a novel radial block copolymer mixture which can be readily molded, extruded and otherwise processed by customary processes, a thermoplastic material which is compatible and can be sealed or otherwise connected to other types of plastic materials in a parenteral administration set, a novel plastic composition which is compatible with the usual plasticizers, fillers, chelators, lubricants, etc., which are necessary in the fabrication of plastic materials.

SUMMARY OF THE INVENTION

The foregoing advantages are accomplished and the shortcomings of the prior art are overcome by the present radial block copolymer mixture which is composed of (a) from about 10 - 90% by weight of a butadiene-styrene radial block copolymer having a butadiene content in the range of about 85 - 60% by weight and a styrene content in the range of about 15 - 40% by weight, (b) from about 90 - 10% by weight of a butadiene-styrene radial block copolymer having differing butadiene and styrene contents, but falling within the range of about 85 - 60% by weight and a styrene content in the range of about 15 - 40% by weight which can be incorporated with (c) 3 - 75% by weight of certain polymeric materials including polyolefin-butyl rubber graft copolymers, chlorinated polyethylene, styrene-olefin block copolymers, polyether urethane elastomers, polyisobutylene and mixtures thereof which will provide a nonclear material which can be punctured without coring. In a preferred composition, one of the radial block copolymers has a butadiene content of about 70% by weight and a styrene content of 30% by weight and the other butadiene-styrene copolymer has a butadiene content of about 60% by weight and a styrene content of about 40% by weight with the copolymer having the 70:30 butadiene-styrene ratio present in an amount of about 3:1 parts by weight to the copolymer having the 60:40 butadiene-styrene content.

DESCRIPTION OF THE PREFERRED EMBODIMENT

In the following Examples, certain polymers, plasticizers, chelators, lubricants, antioxidants, etc., are referred to in composing the novel compositions of this invention. All of the materials are readily available on the commercial market and a brief explanation of them is given.

| Product | Trade Name | Source |
| --- | --- | --- |
| Polymers | | |
| Radial block co-polymer (70:30 butadiene-styrene) | Solprene 411 | Phillips Petroleum Co. |
| Radial block co-polymer (60:40 butadiene-styrene) | Solprene 414 | Phillips Petroleum Co. |
| Polyolefin-butyl rubber grafted copolymer | ET-L-3100 | Allied Chemical Corp. |
| Styrene-olefin block copolymer | Telcar 101 | B. F. Goodrich Chemical Co., Division of B. F. Goodrich |
| Chlorinated polyethylene | CPE-3623 | Dow Chemical Co. |
| Polyether urethane elastomer | Roylar E-85 | Uniroyal Chemical Co., Division of Uniroyal, Inc. |
| Polyisobutylene | Vistanex 120 | Exxon Chemical Co, U.S.A. |
| Plasticizer | | |
| Mineral oil U.S.P. grade | — | Any available |
| Lubricants | | |
| Mono fatty acid ester of fatty alcohols | Loxial G-40 | Henkel, Inc. |
| Complex ester of unsaturated fatty acid | Loxiol G-73 | Henkel, Inc. |
| Montanic acid ester | Wax OP | American Hoechst Corp. |
| Oxidized polyethylene wax | AC629A | Allied Chemical Co. |
| Antioxidants | | |
| Hindered phenol | Mark 1220 | Argus Chemical Corp., Subsidiary of Witco Chemical Co. |
| Butylated hydroxy toluene | Ionol CP | Shell Chemical Co. |
| Octadecyl 3-(3',5'- | Irganox 1076 | Ciba-Geigy |

-continued

| Product | Trade Name | Source |
|---|---|---|
| ditert-butyl-4'-hydroxyphenyl) propionate | | Corp. |
| Tetrakis [methylene-3(3',5'-di-t-butyl hydroxyphenyl) propionate]methane | Irganox 1010 | Ciba-Geigy Corp. |
| Hindered phenol | Mark 1883 | Argus Chemical Corp., Subsidiary of Witco Chemical Co. |

The invention is disclosed in further detail by means of the following Examples which are set forth for the purpose of illustrating the invention, but in no way are to be construed as limiting the invention to the precise amounts, ingredients or conditions indicated.

EXAMPLE I

| Ingredients | Formula by Parts | % Comp. |
|---|---|---|
| Radial block copolymer (70:30 butadiene-styrene) | 37.5 | 33.94 |
| Radial block copolymer (60:40 butadiene-styrene) | 12.5 | 11.30 |
| Polyolefin-butyl rubber grafted copolymer | 50.0 | 42.25 |
| Chlorinated polyethylene | 10.0 | 9.20 |
| Lubricant (mono fatty acid ester of fatty alcohols) | 0.25 | 0.23 |
| Antioxidant (hindered phenol) Mark 1220 | 0.25 | 0.23 |
| | 110.50 | 100.00 |

Formulations were prepared with the above ingredients by mixing the formulation on a base of 300 grams of butadiene-styrene radial block copolymers. The materials were fused on a standard two-roll mill at 300°– 325° F. and milled until a homogeneous blend was obtained. Pharmaceutical closures of the intravenous bag reseal type were made from ground portions of the roll milled sheet by transfer molding. Test results made on these materials are indicated in in Table I.

EXAMPLE II

| Ingredients | Formula by Parts | % Comp. |
|---|---|---|
| Radial block copolymer (70:30 butadiene-styrene) | 75.0 | 59.80 |
| Radial block copolymer (60:40 butadiene-styrene) | 25.0 | 19.90 |
| Styrene-olefin block copolymer | 15.0 | 12.00 |
| Mineral oil | 10.0 | 8.00 |
| Lubricant (complex ester of unsaturated fatty acid) | 0.25 | 0.15 |
| Antioxidant (butylated hydroxy toluene) | 0.25 | 0.15 |
| | 125.50 | 100.00 |

The materials were prepared in the same manner as in Example I and the properties of the materials are shown in Table I. Pharmaceutical closures of the intravenous bag reseal type were made from this material.

EXAMPLE III

| Ingredients | Formula by Parts | % Comp. |
|---|---|---|
| Radial block copolymer (70:30 butuadiene-styrene) | 75.0 | 52.72 |
| Radial block copolymer (60:40 butadiene-styrene) | 25.0 | 17.56 |
| Chlorinated polyethylene | 41.0 | 28.82 |
| Mineral oil | 1.0 | 0.70 |
| Antioxidant (octadecyl 3-(3',5'-ditert-butyl-4'-hyroxyphenyl)propionate) | 0.25 | 0.20 |
| | 142.25 | 100.00 |

The materials were prepared in the same manner as described in Example I and the properties are shown in Table I. Pharmaceutical parts such as a 28 mm. I.V. container closure and a unit dose syringe plunger were made from this compound.

EXAMPLE IV

| Ingredients | Formula by Parts | % Comp. |
|---|---|---|
| Radial block copolymer (70:30 butadiene-styrene) | 30.0 | 29.85 |
| Radial block copolymer (60:40 butadiene-styrene) | 10.0 | 9.95 |
| Chlorinated polyethylene | 25.0 | 24.88 |
| Polyether urethane elastomer | 35.0 | 34.82 |
| Lubricant (montanic acid ester) | 0.25 | 0.25 |
| Antioxiant (tetrakis [methylene-3(3',5'-di-t-butyl hydroxyphenyl)propionate]methane) | 0.25 | 0.25 |
| | 100.5 | 100.00 |

The materials were prepared as described in Example I and the results of the physical properties are shown in Table I. Pharmaceutical parts, such as a unit dose syringe plunger and a 28 mm. closure, were made from this formulation. It should be noted that the addition of the polyether urethane in this Example as compared to Example III gives improved reseal and lower extraction.

EXAMPLE V

| Ingredients | Formula by Parts | % Comp. |
|---|---|---|
| Radial block copolymer (70:30 butadiene-styrene) | 75.0 | 63.80 |
| Radial block copolymer (60:40 butadiene-styrene) | 25.0 | 21.30 |
| Polyisobutylene | 16.0 | 13.60 |
| Mineral oil | 1.0 | 0.90 |
| Lubricant (oxidized polyethylene wax) | 0.25 | 0.20 |
| Antioxidant (hindered phenol) Mark 1883 | 0.25 | 0.20 |
| | 117.50 | 100.00 |

The materials were prepared as described in Example Table I and the results of the physical properties are shown in Table I. The formulation presented in this Example has the best reseal characteristics of all and it borders on being clear. Unpigmented, it is very translucent. Pharmaceutical parts such as an intravenous set reseal, I.V. bag reseal and 28 mm. closure were molded from this formulation.

Table I

COMPARISON OF 75:25 BLEND OF RADIAL BLOCK COPOLYMERS TO THE SEPARATE RADIAL BLOCK COPOLYMERS

| Formulation | Radial Block Copolymer | (1a) 100% Modulus (psi) | (1b) Ultimate Tensile (psi) | (1c) % Elongation | (2) Compression Set % | (3) Nephelos Extract. | (4) Shore "A" | (5) Reseal Pressure (lbs.) |
|---|---|---|---|---|---|---|---|---|
| Example I | 75-Solprene 411 / 25-Solprene 414 | 350 | 1000 | 480 | 72 | precipitate | 60 | 17 |
| | Solprene 411 | 225 | 440 | 430 | 104 | precipitate | 59 | 20 |
| | Solprene 414 | 275 | 420 | 300 | 120 | precipitate | 60 | 10 |
| Example II | 75-Solprene 411 / 25-Solprene 414 | 370 | 2000 | 550 | 88.2 | 38 | 66 | 32 |
| | Solprene 411 | 340 | 780 | 520 | 94.1 | 40 | 69 | 9 |
| | Solprene 414 | 440 | 1400 | 490 | 104 | 41 | 77 | 5 |
| Example III | 75-Solprene 411 / 25-Solprene 414 | 300 | 3350 | 700 | 27.4 | 38 | 69 | 40 |
| | Solprene 411 | 300 | 2690 | 690 | 102 | 44 | 71 | 24 |
| | Solprene 414 | 475 | 3350 | 650 | 121 | 54 | 76 | 20 |
| Example IV | 75-Solprene 411 / 25-Solprene 414 | 400 | 3010 | 600 | 85 | 17 | 71 | 35 |
| | Solprene 411 | 360 | 2970 | 590 | 98 | 18 | 69 | 31 |
| | Solprene 414 | 460 | 2850 | 590 | 94 | 23 | 77 | 32 |
| Example V | 75-Solprene 411 / 25-Solprene 414 | 285 | 2425 | 680 | 44.9 | 16 | 70 | 40 |
| | Solprene 411 | 250 | 1610 | 630 | 92 | 22 | 69 | 30 |
| | Solprene 414 | 450 | 2860 | 640 | 114 | 38 | 80 | 36 |

An explanation of the various tests is as follows:

1. The 100% Modulus, Ultimate Tensile and % Elongation were obtained using ASTM Test Method: D-412-66 using a Type C die and an Instron Tensile Tester.
   a. 100% Modulus is the force required to elongate the dumbbell-shaped sample 100% using a 1-inch bench mark for reference.
   b. Ultimate Tensile is the force per cross sectional area required to pull the sample apart.
   c. % Elongation is the elongation of the sample at break. A one-inch bench mark is placed on the sample before elongation. Then the distance between the marks at break minus one inch times 100 gives the percent elongation.

2. Compression Set — the lower the figure, the better rubber replacement is obtained. The value of the compression set number indicates how much permanent deformation occurred after the sample was compressed.

3. Nephelos Extraction — this is an alkaline extraction, pH 11. A low value indicates a clean compound.

4. Shore "A" Durometer (ASTM-D-2240) is a procedure for determining indentation hardness of materials. This method is based on a specified indentor forced into the material under specified conditions.

5. Reseal — this is an internal devised test which shows how much air pressure is necessary to break the seal of the diaphragm after piercing with a 20 gauge needle five times. A high value indicates very good reseal.

It will be noted in Table I that comparative data is given for the Solprene 411 and Solprene 414 in comparison with the five Examples. These formulations were individually composed using the Solprene 411 and the Solprene 414 alone with all other ingredients of the composition being the same as they were for the combination of the 75:25 Solprene 411 and 414 radial block copolymers. The Table indicates that improved properties are obtained when utilizing the combination of the two radial block copolymers with the added polymeric material to obtain the desired elastomeric properties.

In the foregoing Examples, certain thermoplastic materials were indicated as being incorporated with the additional polymers or copolymers. It should be understood that other copolymers which could be utilized to have an elastomeric effect on the combined radial block copolymers composed of the butadiene-styrene moieties could be incorporated as long as they will impart unique properties such as hot strength and resistance to cold flow; will be compatible at working levels; can be used in nontoxic applications; will process at 300° – 400° F. in the compound; be noncoring and nonclear. These would include polymers or copolymers of the following types: styrene acrylonitrile, acetyls, polyamides, polybutenes, polyesters, polyolefins, polymethyl pentenes, polystyrene, and mixtures thereof. However, the preferred additive polymeric materials are polyolefin-butyl rubber graft copolymers, chlorinated polyethylene, styrene-olefin block copolymers, polyether urethane elastomers, and mixtures of these.

Certain amounts of the polymeric materials are indicated in the Examples. If desired, other quantities of these in relation to the radial block copolymers could be employed as follows: chlorinated polyethylene 3 to 35%; styrene-olefin block copolymers 3% to 12%; polyether urethane elastomers 3 to 50%; polyisobutylene 3% to 25%; mixtures of polyolefin-butyl rubber grafted copolymer and chlorinated polyethylene 3 to 33%; polyether urethane elastomer and chlorinated polyethylene 3 to 60%; 3 – 50% of polyester urethane elastomer and chlorinated polyethylene and 3 – 50% of polyolefin-butyl rubber grafted copolymer and external plasticizer.

Plasticizers may be incorporated into the foregoing compositions in varying concentrations. These plasticizers would be those sanctioned for use by the U.S. Food and Drug Administration. The preferred choices are U.S.P. grade mineral oil and monomeric epoxidized esters in low concentrations, i.e., less than 30% by weight. Of course, chelators, lubricants, antioxidants, pigments and fillers may be incorporated into these compositions in required concentrations. As indicated in the Examples, the compositions may be mixed or blended by conventional plastics or rubber methods. For example, mixing may be done by simple tumbling, intensive mixers, open mill mixing, Banbury mixing or by extrusion and pelletizing or dicing. The novel plastic compositions of this invention can be compression, transfer or injection molded according to standard plastic fabrication techniques. The resulting product can be of various shapes and configurations such as a pharmaceutical sealing component including a puncturable reseal device, a container closure or a syringe sealing ring. When the composition is in the form of a reseal device, it can be punctured without coring which is determined by the cut resistance to a new, sharp hypodermic needle and the particulate fragments generated, if any. Further, the compositions of this invention can be molded into rubber-like syringe bulbs.

Table II shows the properties obtained with twenty radial block copolymer combinations of differing butadiene-styrene contents. Conclusions which can be drawn from this data are:

1. Shore "A" durometer increases with higher styrene content. Higher durometers are suitable for plastics molded parts while lower durometers are favored for closures.

age molecular weight of the blend of the radial block copolymers is between 150,000 and 270,000.

It will thus be seen that through the present invention there is provided a novel plastic composition which through its physical characteristics can be utilized as a pharmaceutical rubber composition in components for administering fluids to the body. The composition has a high degree of elasticity and resealability, yet can be processed by various plastic and rubber fabricating techniques. Most importantly, the compositions have very low extraction values which makes them especially suitable for use in conjunction with parenteral solutions.

The foregoing invention can now be practiced by those skilled in the art. Such skilled persons will know that the invention is not necessarily restricted to the particular embodiments presented herein. The scope of the invention is to be defined by the terms of the following claims as given meaning by the preceding description.

TABLE II

|  |  | Styrene % | Molec. Wt. × 1,000 | 1 | 2 | 3 | 4 | 5 | 6 | 7 | 8 | 9 | 10 |
|---|---|---|---|---|---|---|---|---|---|---|---|---|---|
| Radial Block Copolymer | A | 30 | 300 |  |  |  |  |  | 75 | 77.4 | 48 | 33 | 77.4 |
|  | B | 40 | 150 | 100 |  |  |  |  | 25 |  |  |  |  |
|  | C | 30 | 150 |  | 100 |  |  |  |  |  |  |  |  |
|  | D | 25 | 150 |  |  | 100 |  |  |  |  | 22.6 | 52 | 67 |
|  | E | 15 | 150 |  |  |  | 100 |  |  |  |  |  | 22.6 |
|  | F | 40 | 250 |  |  |  |  | 100 |  |  |  |  |  |
| Additional Polymers and Additives |  |  |  | 27.7 | 27.7 | 27.7 | 27.7 | 27.7 | 27.7 | 27.7 | 27.7 | 27.7 | 27.7 |
| Avg. Molecular Wt. of Blend × 1,000 |  |  |  | 150 | 150 | 150 | 150 | 250 | 262.5 | 266.1 | 222 | 200.5 | 266.1 |
| % Styrene in Blend |  |  |  | 40 | 30 | 25 | 15 | 40 | 32.5 | 29 | 27.8 | 27 | 26.6 |
| 100% Modulus - psi |  |  |  | 442 | 250 | 225 | 100 | 467 | 300 | 293 | 263 | 250 | 272 |
| Ultimate Tensile Strength-psi |  |  |  | 778 | 673 | 693 | 140 | 3450 | 2430 | 2583 | 1338 | 1100 | 1605 |
| Ultimate Elongation-% |  |  |  | 467 | 527 | 610 | 457 | 677 | 713 | 740 | 667 | 647 | 720 |
| Alkaline Extraction Nephelos Units |  |  |  | 22 | 47 | 49 | 42 | 13 | 3 | 26 | 30 | 42 | 33 |
| Shore "A" Durometer |  |  |  | 65 | 55 | 45 | 27 | 80 | 70 | 64 | 55 | 56 | 58 |
| Relative Clarity |  |  |  | +3 | +4 | +3 | +2 | +2 | +5. | +4 | +5 | +5 | +4 |
|  |  | Styrene % | Molec. Wt. × 1,000 | 11 | 12 | 13 | 14 | 15 | 16 | 17 | 18 | 19 | 20 |
| Radial Block Copolymer | A | 30 | 300 | 48 | 33 |  |  |  |  |  |  |  |  |
|  | B | 40 | 150 |  |  | 25 |  |  |  |  |  |  |  |
|  | C | 30 | 150 |  |  | 75 | 50 | 33 |  |  |  |  |  |
|  | D | 25 | 150 |  |  |  |  |  | 50 | 33 | 16 |  |  |
|  | E | 15 | 150 | 52 | 67 |  |  |  |  |  |  | 33 | 16 |
|  | F | 40 | 250 |  |  |  | 50 | 67 | 50 | 67 | 84 | 67 | 84 |
| Additional Polymers and Additives |  |  |  | 27.7 | 27.7 | 27.7 | 27.7 | 27.7 | 27.7 | 27.7 | 27.7 | 27.7 | 27.7 |
| Avg. Molecular Wt. of Blend × 1,000 |  |  |  | 222 | 200.5 | 150 | 200 | 217 | 200 | 217 | 234 | 217 | 234 |
| % Styrene in Blend |  |  |  | 23.3 | 20 | 32.5 | 35 | 36.7 | 32.5 | 35 | 38 | 31.6 | 35.9 |
| 100% Modulus-psi |  |  |  | 217 | 175 | 283 | 333 | 425 | 237 | 352 | 417 | 293 | 373 |
| Ultimate Tensile Strength-psi |  |  |  | 815 | 532 | 707 | 1842 | 3328 | 980 | 2847 | 3358 | 1633 | 3007 |
| Ultimate Elongation-% |  |  |  | 637 | 617 | 517 | 650 | 707 | 630 | 713 | 710 | 687 | 713 |
| Alkaline Extraction Nephelos Units |  |  |  | 59 | 50 | 40 | 26 | 18 | 37 | 29 | 19 | 39 | 24 |
| Shore "A" Durometer |  |  |  | 49 | 41 | 58 | 69 | 77 | 50 | 70 | 77 | 61 | 74 |
| Relative Clarity |  |  |  | +3 | +4 | +5 | +4 | +3 | +5 | +4 | +3 | +5 | +3 |

2. Tensile strength increases with styrene content and preferred ranges lie above 25% styrene.

3. Ultimate elongation shows desired maxima between 25 and 37% styrene.

4. One-hundred percent modulus increases with styrene content. Higher values above 30% styrene content are desired for plastics usage in tubing and plastics molded parts. Lower values, below 30%, would be desirable in closure applications.

5. Alkaline extraction decreases with increased styrene content. It is desired to obtain the lowest values.

6. Optimum clarity is found between 25 - 35% styrene content.

It should be pointed out that in all 20 radial block copolymer formulations the additional polymers and additives employed in conjunction with the radial block copolymers are the same as in the previous Examples. It will also be seen from the Table that the preferred aver-

We claim:

1. A radial block copolymer mixture having a high degree of resealability and noncoring properties consisting essentially of (a) from about 10 - 90% by weight of a butadiene-styrene radial block copolymer having a butadiene content in the range of about 85 - 60% by weight and a styrene content in the range of about 15 - 40% by weight, (b) from about 90 - 10% by weight of a butadiene-styrene radial block copolymer having a differing butadiene content in the range of about 85 - 60% by weight and a styrene content in the range of about 15 - 40% by weight and (c) about 3 - 75% by weight of said block copolymer mixture of chlorinated polyethylene, which results in a nonclear composition, both said radial block copolymers having an average molecular weight of at least 150,000 as measured by inherent viscosity in toluene.

2. The radial block copolymer mixture as defined in claim 1 wherein said (a) and (b) portions of said radial block copolymer mixture are present in a ratio of about three parts of the (a) portion to one part of the (b) portion.

3. The radial block copolymer as defined in claim 1 wherein the amount of butadiene in said (a) portion of said radial block copolymer mixture is 70% by weight and said styrene amount is 30% by weight and wherein the amount of butadiene in said (b) portion of said radial block copolymer mixture is 60% by weight and said styrene is 40% by weight.

4. The radial block copolymer mixture as defined in claim 1 wherein said polymeric material is a mixture of polyolefin-butyl rubber graft copolymer and chlorinated polyethylene.

5. The radial block copolymer mixture as defined in claim 1 wherein said polymeric material is chlorinated polyethylene and polyether urethane elastomers.

6. The radial block copolymer mixture as defined in claim 1 wherein said polymeric material is chlorinated polyethylene and polyester urethane elastomers.

7. The radial block copolymer mixture as defined in claim 1 wherein said mixture is molded to form a pharmaceutical sealing component.

8. The pharmaceutical sealing component as defined in claim 7 in the form of a puncturable reseal device.

9. The pharmaceutical sealing component as defined in claim 8 in the form of a container closure.

10. The pharmaceutical sealing component as defined in claim 11 in the form of a syringe plunger sealing ring.

11. The radial block copolymer as defined in claim 1 wherein said mixture is molded to form a rubber-like syringe bulb.

* * * * *

UNITED STATES PATENT AND TRADEMARK OFFICE
CERTIFICATE OF CORRECTION

PATENT NO. : 4,048,255
DATED : September 13, 1977
INVENTOR(S) : Edward Lawrence Hillier, *et al*.

It is certified that error appears in the above-identified patent and that said Letters Patent are hereby corrected as shown below:

Column 1, line 22, please delete 3,281,283 and substitute therefor 3,281,383.

Column 4, line 62, please delete the word Table.

Column 10, line 15, please delete the numeral 11 and substitute therefor 7

Signed and Sealed this

Twenty-first Day of February 1978

[SEAL]

Attest:

RUTH C. MASON
*Attesting Officer*

LUTRELLE F. PARKER
*Acting Commissioner of Patents and Trademarks*